(12) United States Patent
Tashima et al.

(10) Patent No.: US 7,219,400 B2
(45) Date of Patent: May 22, 2007

(54) CLIP AND AIRBAG BODY INSTALLATION STRUCTURE

(75) Inventors: Taku Tashima, Toyonaka (JP); Kazuo Ito, Nagoya (JP)

(73) Assignee: Nifco Inc., Yokohama, Kanagawa (JP)

( * ) Notice: Subject to any disclaimer, the term of this patent is extended or adjusted under 35 U.S.C. 154(b) by 139 days.

(21) Appl. No.: 11/094,316

(22) Filed: Mar. 31, 2005

(65) Prior Publication Data
US 2005/0217083 A1 Oct. 6, 2005

(30) Foreign Application Priority Data
Apr. 2, 2004 (JP) .............................. 2004-109833

(51) Int. Cl.
*F16B 5/06* (2006.01)
(52) U.S. Cl. .......................................... 24/297; 24/453
(58) Field of Classification Search ................. 24/453, 24/297, 606, 607; 174/138 D; 403/408.1; 411/508–510, 44–53, 71–75, 77, 340, 341, 411/344; 280/728.2
See application file for complete search history.

(56) References Cited

U.S. PATENT DOCUMENTS 3,074,134 A * 1/1963 Buechler ..................... 24/289
6,431,585 B1 * 8/2002 Rickabus et al. ......... 280/728.3
6,615,459 B2 * 9/2003 Sano ............................ 24/453
6,659,701 B1 * 12/2003 Risdale ....................... 411/508
2002/0125705 A1 * 9/2002 Wong et al. ............. 280/743.2

FOREIGN PATENT DOCUMENTS

JP          H4-29123          7/1992

* cited by examiner

*Primary Examiner*—James R. Brittain
(74) *Attorney, Agent, or Firm*—Manabu Kanesaka

(57) ABSTRACT

A clip includes a female member, a male member, and a connecting piece. The female member is formed in a cylindrical shape with two open ends, and has an outer flange at an upper cylinder end. A flexible engaging piece is formed in a side section defined by slits formed in the side section, and is provided with an engaging surface facing the outer flange. The male member is formed of a leg shaft and a head provided at an upper end of the leg shaft for a pushing operation. The connecting piece connects the head of the male member with the outer flange of the female member, so that a lower end of the leg shaft of the male member is positioned directly above the upper cylinder end of the female member.

8 Claims, 5 Drawing Sheets

CLIP AND AIRBAG BODY INSTALLATION STRUCTURE

BACKGROUND OF THE INVENTION AND RELATED ART STATEMENT

The present invention relates to a clip comprising a female member to be inserted into an installation hole formed in a panel in a temporarily fixed state, and a male member to be pushed into the temporarily fixed female member to change the temporarily fixed state into a secure and fully fixed state. The present invention also relates to an airbag installation structure that includes the clip.

Patent Reference 1 has disclosed a clip formed of an insert to be inserted into a through hole of a member, and a flange having an opening for inserting the insert and connected to the insert with a bendable connecting piece. In the clip, the insert is pushed into the through hole via the opening of the flange while bending the connecting piece, so that the clip is fixed to the member.

When the insert is inserted into the through hole, the connecting piece is bent such that a bending center moves away from an axis of the insert. Accordingly, it is necessary to provide a certain space around the through hole when the clip is attached to the member. In particular, when the insert has a long shaft, it is necessary to make the connecting piece long. In this case, when the connecting piece is bent, the connecting piece outwardly extends greatly, thereby making it difficult to increase a length of the insert.

Patent Reference 1: Japanese Utility Model (Kokoku) No. 04-29123

In view of the problem described above, an object of the present invention is to provide a clip formed of a female member, a male member, and a connecting piece connecting the female member and the male member. When the male member is pushed into the female member while bending the connecting piece, the clip is attached to an installation hole in a fully fixed state. Even when the male member has a long leg shaft to be inserted into the female member, thereby making the connecting piece relatively long, it is possible to prevent the connecting piece from outwardly extending greatly.

Further objects and advantages of the invention will be apparent from the following description of the invention.

SUMMARY OF THE INVENTION

In order to attain the objects described above, according to the present invention, a clip includes a female member, a male member, and a connecting piece. The female member is formed in a cylindrical shape with two open ends, and has an outer flange at an upper cylinder end. A flexible engaging piece is formed in a side cylinder section defined by slits formed in the cylinder side section, and is provided with an engaging surface facing the outer flange. When the female member is inserted into an installation hole, the flexible engaging piece deforms inwardly. When the female member is fully inserted into the installation hole, the flexible engaging piece restores an original shape thereof to engage an edge of the installation hole.

The male member is formed of a leg shaft and a head provided at an upper end of the leg shaft for a pushing operation. When the leg shaft is pushed into the female member from the upper cylinder end, the male member prevents the female member from deforming inwardly. The connecting piece connects the head of the male member with the outer flange of the female member, so that a lower end of the leg shaft of the male member is positioned directly above the upper cylinder end of the female member. The connecting piece is bent when the male member is pushed into the female member.

The connecting piece has an upper end connected to the head of the male member and a lower end connected to the outer flange of the female member on one side of an axial line of the leg shaft of the male member. When the male member is pushed into the female member, the connecting piece is bent around a mid section thereof as a bending center and a side on the other side of the axis line of the leg shaft of the male member as an outside of the bending.

In the invention, the male member and female member are integrated with the connecting piece, so that the clip is easily handled in a production line. The male member is supported on the female member via the connecting piece while the lower end of the shaft leg is positioned directly above the upper cylinder end of the female member. Accordingly, from a temporarily fixed state wherein the female member is inserted into the installation hole to engage the edge of the hole, it is possible to simply push the head of the male member straight without positioning the male member, so that the male member is properly pushed into the female member. Therefore, it is possible to permanently attach the female member to the installation hole with a single motion.

When the male member is pushed into the female member, the connecting piece is bent and sandwiched between the head of the male member and the outer flange of the female member in a folded state. At this time, the connecting piece is bent with the mid section thereof as the bending center and the side thereof on the other side of the axis line of the leg shaft of the male member as the outside of the bending. Accordingly, the connecting piece does not extend outwardly beyond an outer edge of the head of the male member. Therefore, when the clip is fully fixed, it is not necessary to provide a space beyond a size of the head of the male member at a location where the clip is installed. As a result, it is possible to increase a length of the connecting piece or the leg shaft of the male member supported by the connecting piece.

According to the present invention, the connecting pieces may be disposed on both sides of the axis shaft of the male member. In this case, it is possible to stably support the male member above the outer flange of the female member.

According to the present invention, the head of the male member and the outer flange of the female member may be formed in substantially square shapes, respectively. One of a pair of connecting pieces has an upper end connected to one corner of the head of the male member, and a lower end connected to one corner of the outer flange of the female member located directly below the one corner of the head. The other of the pair of connecting pieces has an upper end connected to another corner of the head of the male member diagonally opposite to the one corner, and a lower end connected to another corner of the outer flange of the female member diagonally opposite to the one corner. In this case, it is possible to stably support the male member above the outer flange of the female member.

According to the present invention, a thin-wall section may be formed at a substantially mid position of the connecting piece in a longitudinal direction. A half of the length of the connecting piece is fit within a width of the head of the male member. Accordingly, it is possible to insert the leg shaft of the male member straight into the female member by pushing the male member. In a fully fixed state in which the male member is fully inserted into the female member, the connecting piece sandwiched between the head of the male member and the outer flange of the female member in a folded state does not extend outwardly over the outer edge of the head.

According to the present invention, an airbag body installation structure or configuration includes an installation plate attached to an airbag body of an airbag device and having an installation hole, and the clip described above. After the installation hole of the installation plate is aligned with an installation hole formed in an automotive body panel, the female member is inserted into the installation holes, and the leg shaft of the male member is pushed into the female member to install the airbag body to the body panel. Accordingly, it is possible to easily and stably install the airbag body in the body panel.

In the clip of the present invention, even when the male member has a relatively long leg shaft, thereby making the connecting piece relatively long, the connecting piece does not extend outwardly greatly. In the airbag body installation configuration of the present invention, it is possible to easily and stably install the airbag body in the body panel. It is also possible to attach the clip with a limited space for the head of the male member around the installation hole of the installation plate.

DETAILED DESCRIPTION OF PREFERRED EMBODIMENTS

Figure 1:
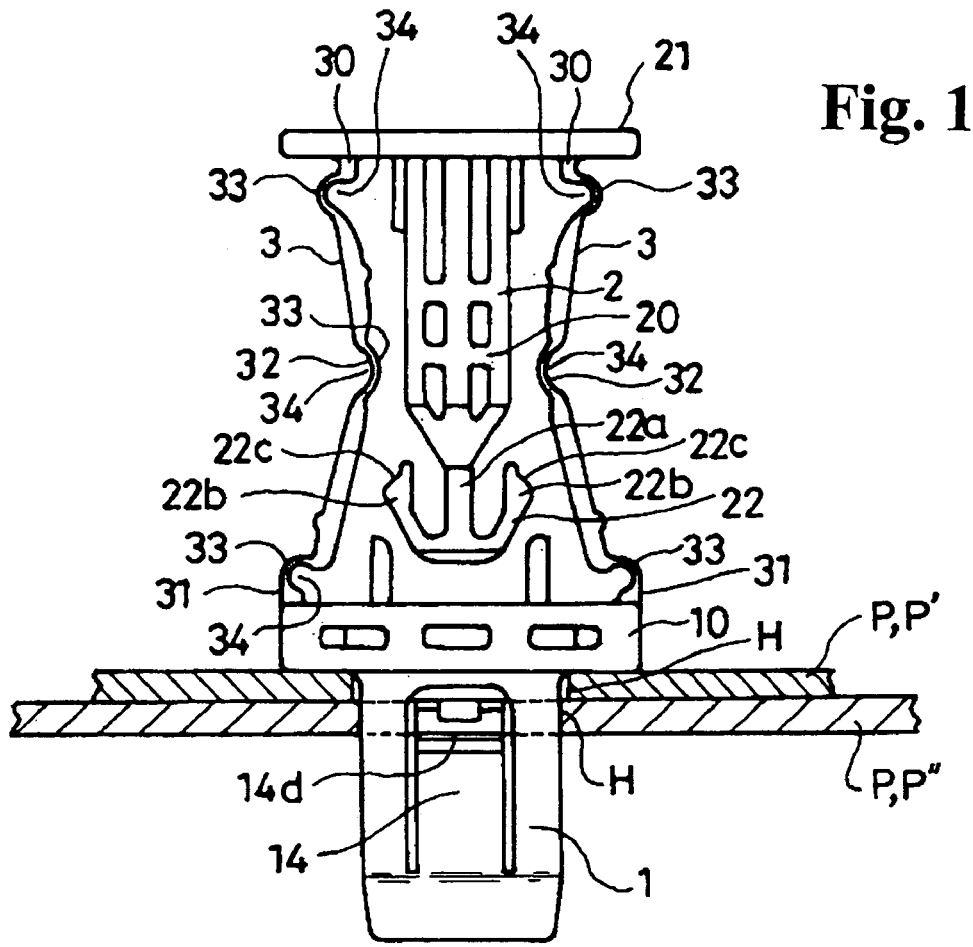
FIG. 1 is a front view of a clip in use according to an embodiment of the present invention.
Figure 2:
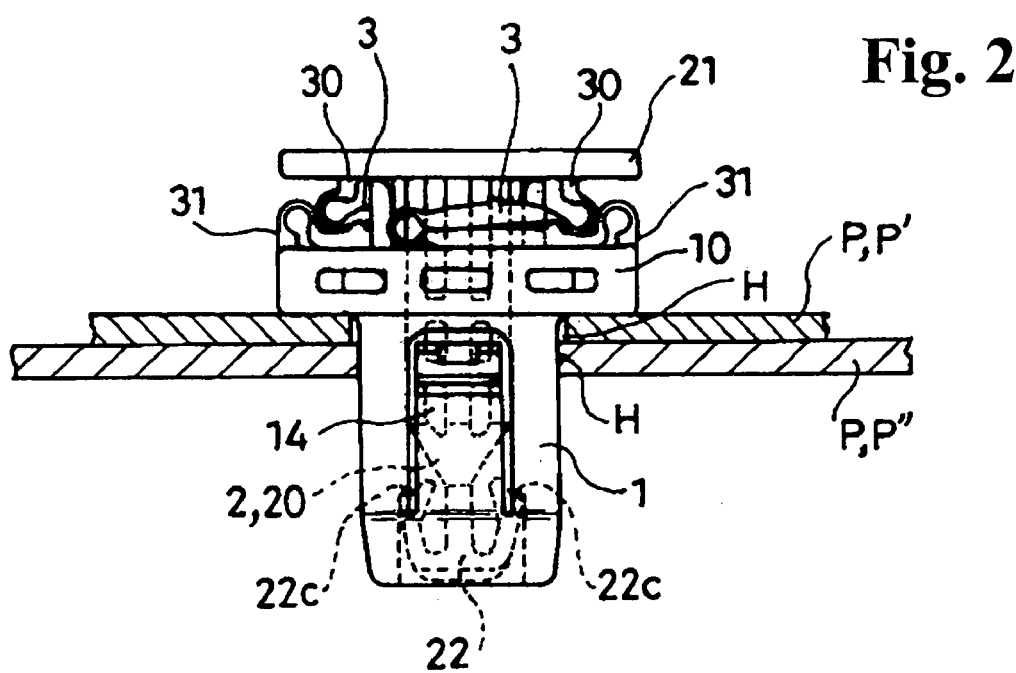
FIG. 2 is another front view of the clip in use.
Figure 3:
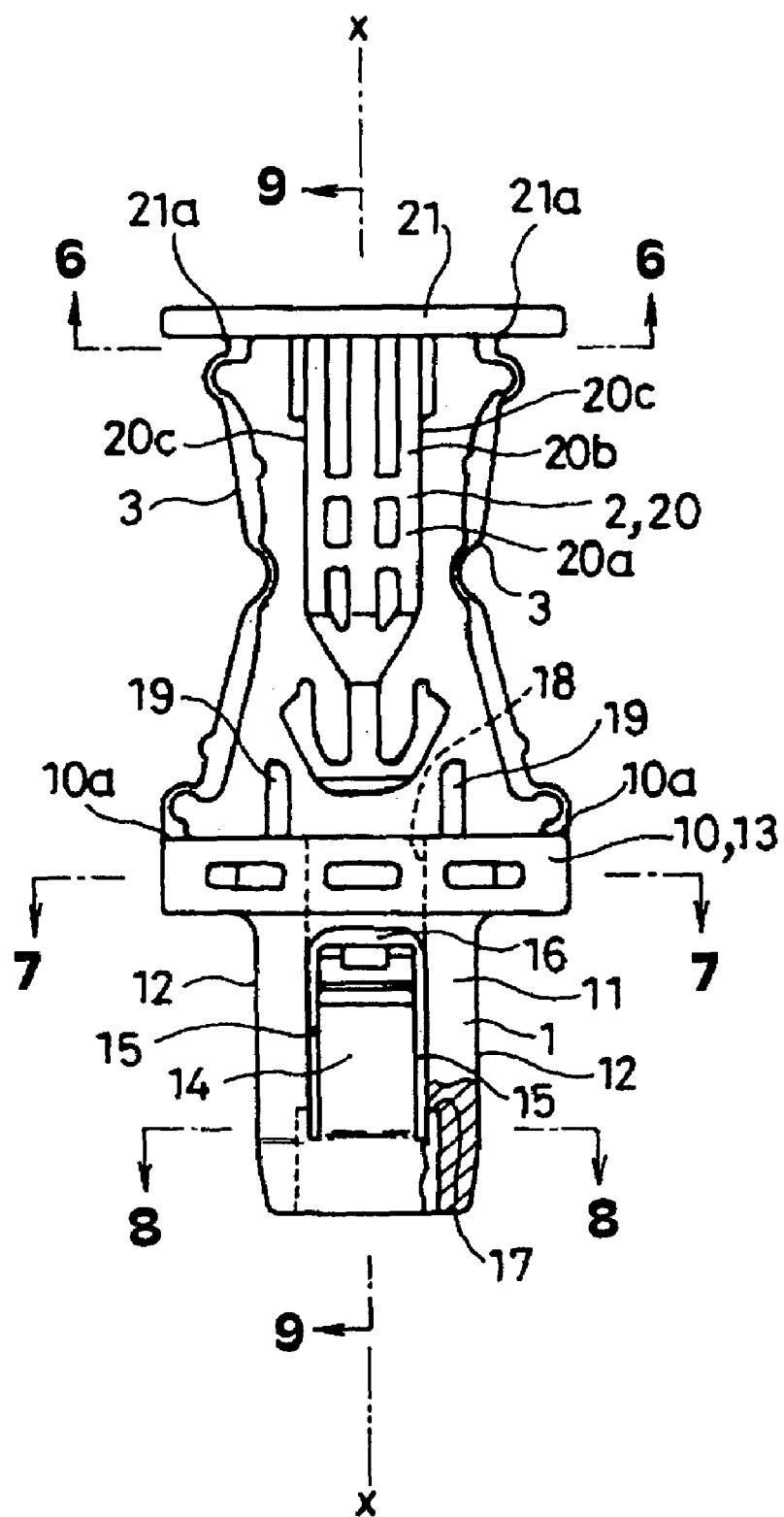
FIG. 3 is a further front view of the clip.
Figure 4:
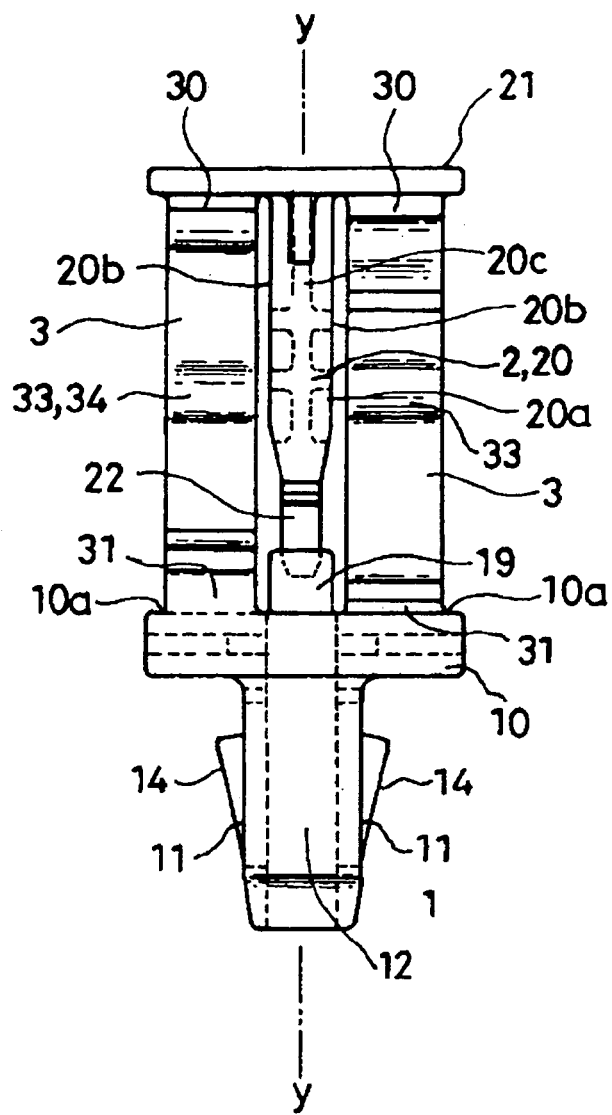
FIG. 4 is a right side view of the clip.
Figure 5:
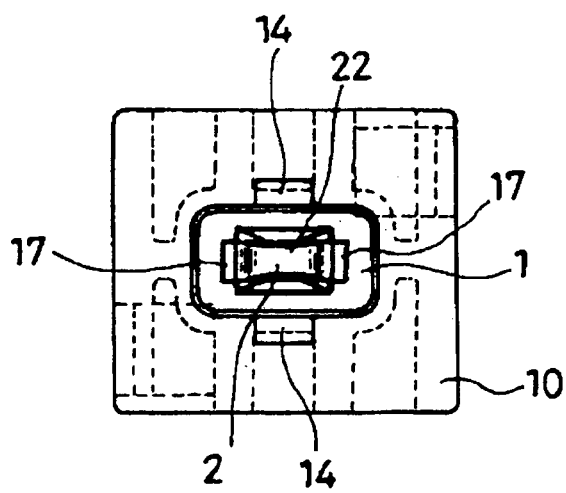
FIG. 5 is a bottom view of the clip.
Figure 6:
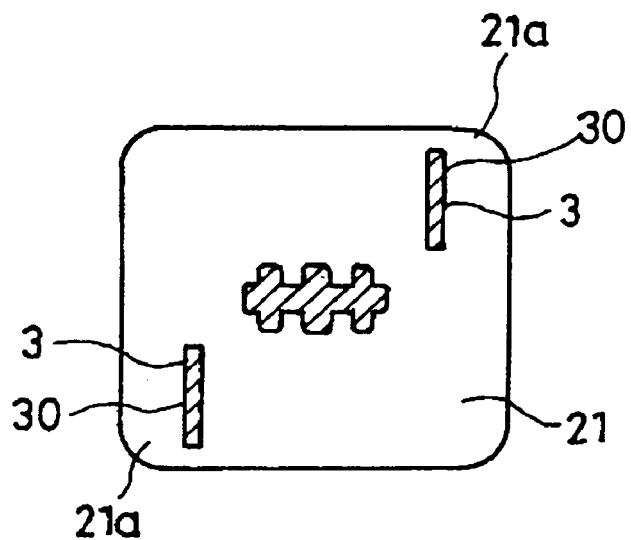
FIG. 6 is a sectional view taken along line 6—6 in FIG. 3.
Figure 7:
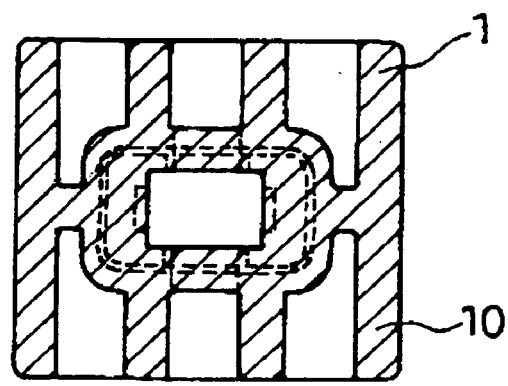
FIG. 7 is a sectional view taken along line 7—7 in FIG. 3.
Figure 8:
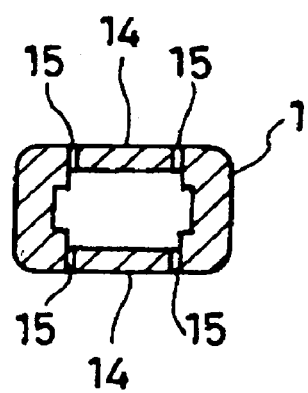
FIG. 8 is a sectional view taken along line 8—8 in FIG. 3.
Figure 9:
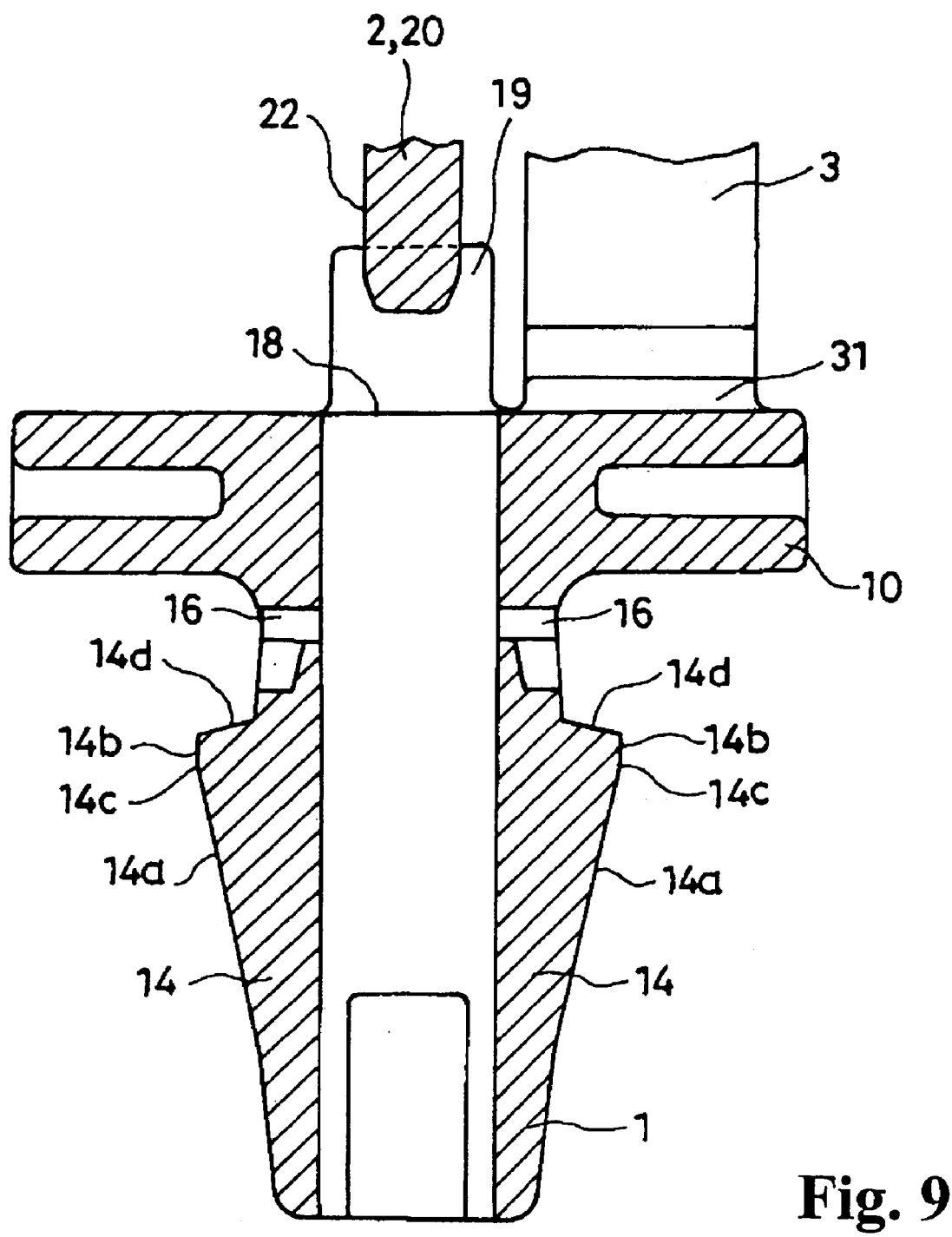
FIG. 9 is a partial sectional view taken along line 9—9 in FIG. 3

Hereunder, embodiments of the present invention will be explained with reference to the accompanying drawings. FIGS. 1 and 2 show a clip according to an embodiment of the present invention in temporarily and fully fixed states, respectively.

The clip comprises a female member 1 inserted into an installation hole H formed in a panel P to be temporarily fixed thereto, and a male member 2 to be pushed into the female member 1 to change the temporarily fixed state of the female member 1 into a fully fixed state. The clip is typically inserted into installation holes H formed in two or more panels P after overlaying the two or more panels P to align the holes, so that the two or more panels P are fastened together via the clip.

In an installation configuration of an airbag body (referred generally to as a bag normally stored in a folded state and deployed by gas discharged from a gas discharging device using an impact of a vehicular collision as a trigger), an installation hole H for the airbag body (omitted in the figures), formed in an installation plate P' attached to the airbag body constituting an airbag device, is aligned with an installation hole H formed in an automotive body panel P'''. Then, the female member 1 of the clip is inserted into the installation holes, and a leg shaft of the male member 2 is subsequently pushed into the female member 1 to install the airbag body to the body panel P'''.

With the configuration, the airbag body can easily and stably be installed to the body panel P'''. In other words, the airbag body can be easily installed to the body panel P in the securely installed state, so that the airbag body does not fall off from the body panel P when the airbag device is activated to deploy the airbag body upon a car collision.

Connecting pieces 3 connect the female member 1 and the male member 2. When the leg shaft 20 of the male member 2 is pushed into the female member 1, the connecting pieces 3 are interposed between an outer flange 10 of the female member 1 and a head 21 of the male member 2 in a folded state without extending out of the head 21. Accordingly, it is necessary to provide a space just for the head 21 of the male member 2 around the installation hole H of the airbag body installation plate P' upon attaching the clip.

The clip comprises the female member 1, the male member 2, and the connecting pieces 3. The female member 1 has a square cylindrical shape with two open ends, and has the outer flange 10 at an upper cylinder end thereof. The female member 1 is formed of a pair of wide width side plates 11 and narrow width side plates 12 disposed between the pair of wide width side plates 11. The square cylinder has substantially square openings at upper and lower cylinder ends thereof, and the upper cylinder end is integrally joined with one surface of a plate part 13. The plate part 13 forms the outer flange 10. An opening 18 of the upper cylinder end of the female member 1 is formed in the other surface of the plate part 13, and guide pieces 19 are disposed at opposing edges of the opening 18 and extend along the opening edges for guiding the leg shaft 20 of the male member 2.

Flexible engaging piece 14 are formed at portions of side cylinder sections of the female member 1 defined by slits formed in the side cylinder sections, and have catching surfaces 14d facing the outer flange 10. When the female member 1 is inserted into the installation hole H, the flexible engaging pieces 14 deform inwardly once and regain an original shape at a position where the insertion is completed, so that the catching surfaces 14d engage the edge of the insertion hole H at the other end.

In the embodiment, the flexible engaging piece 14 is provided in each of the pair of wide width side plates 11 of the square cylinder. More specifically, each of the wide width side plates 11 is provided with a pair of vertical slits 15 extending along the square cylinder axis, and a horizontal slit 16 between the pair of vertical slits 15 at slit ends located near the outer flange 10. The flexible engaging piece 14 has a base at a lower cylinder end of the square cylinder as a center of the deformation, and is defined by the slits 15 and 16.

An outer surface of the flexible engaging piece 14 forms a slanted face 14a gradually projecting from the base toward a free end of the flexible engaging piece 14. The catching surface 14d is formed at an uppermost end of the slanted face 14a. In other words, an engaging projection 14b is formed on the outer surface of the flexible engaging piece 14, and has a crest 14c at the uppermost end of the slanted face 14a.

In the embodiment, the installation hole H has an inner shape corresponding to a section of the square cylinder. A distance between two opposing inner surfaces of the installation hole H is slightly smaller than a distance between the crests 14c of the engaging projections 14b of the flexible engaging pieces 14, and a diameter of the installation hole H is smaller than an outer diameter of the outer flange 10.

When the female member 1 is inserted into the installation hole H from the lower cylinder end of the square cylinder until the outer flange 10 is caught (namely, the position where the insertion is completed), the flexible engaging pieces 14 deform toward inside the square cylinder with the slanted surfaces 14a. Then, the flexible engaging pieces 14 regain an original shape thereof at the positions where the crests 14c of the engaging projections 14b formed in the flexible engaging pieces 14 penetrate beyond the hole edge of the installation hole 14, so that the engaging surfaces 14d engage the hole edge. Accordingly, the female member 1 is temporarily fixed to the installation hole H with a single motion.

In the embodiment, the male member 2 has a leg shaft 20 and a head 21 at an upper end of the leg shaft 20 for a pushing operation. The leg shaft 20 has an upper end integrally joined with one face of the plate shaped head 21 at a substantially center thereof, and has a size to be pushed into the square cylinder of the female member 1 from the upper end thereof. In other words, the leg shaft 20 of the male member 2 has a main section 20a having a section corresponding to a section of the square cylinder of the female member 1.

The leg shaft 20 of the male member 2 also has wide width sides 20b contacting inner surfaces of the wide width side plates 11 of the female member 1, and narrow width sides 20c contacting inner surfaces of the narrow width side plates 12 of the female member 1, when the male member 2 is inserted into the female member 1. With this structure, when the leg shaft 20 is pushed into the female member 1 from the upper cylinder end thereof, the flexible engaging pieces 14 of the female member 1 do not deform inwardly, so that the fixed state of the female member 1 to the installation hole H is securely maintained. (In other words, the fully fixed state is achieved.)

In the embodiment, an anchor-shaped catch section 22 is provided at the lower end of the leg shaft 20. The anchor-shaped catch section 22 is formed of an anchor base 22a extending along the axis of the leg shaft 20 and having an upper end integrally joined with a lower end of a main part 20a; and a pair of anchor arms 22b having lower ends integrally joined with the lower end of the anchor base 22a. The pair of anchor arms 22b gradually projects obliquely away from the anchor base 22a toward free ends thereof, and includes engaging surfaces 22c facing the head 21 at the free ends.

With this structure, when the male member 2 is fully pushed into the female member 1, the anchor arms 22b flexibly deform inwardly and regain an original shape thereof, so that the engaging surfaces 22c engage shoulders 17 from underneath formed on the inner surfaces of the narrow width plates 12 of the female member 1 at the lower cylinder end thereof and facing the lower cylinder end. Accordingly, once the male member 2 is fully pushed into the female member 1, the male member 2 does not come out from the female member 1.

The connecting pieces 3 connect the head 21 of the male member 2 with the outer flange 10 of the female member 1, so that the lower end of the leg shaft 20 of the male member 2 is positioned directly above the upper cylinder end of the female member 1. When the male member 2 is pushed into the female member 1, the connecting pieces 3 bend. The male member 2 is supported above the outer flange 10 of the female member 1 with the connecting pieces 3 in a state that there is a space between the lower end of the leg shaft 20 of the male member 2 and the opening 18 of the upper cylinder end of the female member 1.

Each of the connecting pieces 3 has an upper end 30 joined (integrally connected) with the head 21 of the male member 2 on one side of an axis line x of the leg shaft 20, and a lower end 31 joined (integrally connected) with the outer flange 10 of the female member 1. When the male member 2 is pushed into the female member 1, the connecting pieces 3 bend with mid sections 32 thereof as a bending center and sides facing the other side of the axis line x of the leg shaft 20 of the male member 2 as an outside of the bending.

The male member 2 and the female member 1 are integrated by the connecting pieces 3, thereby making handling in a production line easy. The male member 2 is supported by the female member 1 via the connecting pieces 3, and the lower end of the shaft leg 20 is positioned directly above the upper cylinder end of the female member 1. Accordingly, from the state wherein the female member 1 is inserted into the installation hole H to engage the hole edge and temporarily fixed as described above, the male member 2 can be properly pushed into the female member 1 simply by pushing the head 21 of the male member 2 straight without positioning the male member 2. Therefore, the female member 1 can be fully fixed to the installation hole H with a single motion.

When the male member 2 is pushed into the female member 1, the connecting pieces 3 bend and are interposed in a folded state between the head 21 of the male member 2 and the outer flange 10 of the female member 1. The connecting pieces 3 bend with the mid sections 32 thereof as the bending center and the sides facing the other side of the axis line x of the leg shaft 20 of the male member 2 as the outside of the bending. Accordingly, the bent connecting pieces 3 do not extend beyond the outer edges of the head 21 of the male member 2. In other words, when the clip is fully fixed, it is not necessary to provide a space beyond a size of the head 21 of the male member 2 in a location where the clip is installed. As a result, it is possible to increase a length of the connecting pieces 3 or the leg shaft 20 of the male member 2 supported by the connecting pieces 3.

In the embodiment, the connecting pieces 3 are disposed at both sides of the leg shaft 20 of the male member 2, respectively. More specifically, the connecting pieces 3 are respectively disposed on both sides of an imaginary plane y containing the axis line x of the leg shaft 20 of the male member 2. Accordingly, the male member 2 is stably held above the outer flange 10 of the female member 1. More specifically, the connecting piece 3 located on one side of the imaginary plane y containing the axis line x of the leg shaft 20 of the male member 2 has the upper end 30 connected with the head 21 of the male member 2 and the lower end 31 connected with the outer flange 10 of the female member 1 located on the one side of the imaginary plane y containing the axis line x of the leg shaft 20 of the male member 2. The connecting piece 3 located on the other side of the imaginary plane y containing the axis line x of the leg shaft 20 of the male member 2 has the upper end 30 connected with the head 21 of the male 2 and the lower end 31 connected with the outer flange 10 of the female member 1 on the other side of the imaginary plane y containing the axis x of the leg shaft 20 of the male member 2.

In the embodiment, the head 21 of the male member 2 and the outer flange 10 of the female 1 have square shapes, and one of the connecting pieces 3 has the upper end 30 connected at one corner 21a of the head 21 of the male member 2 and the lower end 31 connected at one corner 10a of the outer flange 10 of the female member 1 located directly below the corner 21a of the head 21. The other of the connecting pieces 3 has the upper end 30 connected at another corner 21a of the head 21 of the male member 2 diagonally opposite to the one corner 21a, and the lower end 31 connected at another corner 10a of the outer flange 10 of the female member 1 diagonally opposite to the one corner 10a. Accordingly, the male member 2 is stably held above the outer flange 10 of the female member 1.

In the embodiment, each of the connecting pieces 3 is provided with a thin-wall section 33 at a substantially mid position in the longitudinal direction, and a half of a length of the connecting pieces 3 is fit within a width of the head 21 of the male member 2. More specifically, each of the connecting pieces 3 is formed in a strip shape and has a groove section 34 extending over the width of the connecting piece 3 at a substantially mid position in the longitudinal direction to form the thin-wall section 33.

The groove section 34 has a groove opening facing the one side of the axis line x of the leg shaft 20 of male member 2. The thin-wall section 33 formed by the groove section 34 has a curved shape with the other side of the axis line x of the leg shaft 20 of male member 2 as the outside of the bending. Accordingly, when the male member 2 is pushed into the female member 1, the connecting pieces 3 bend with the thin-wall section 33 as the bending center 32 and the side facing the other side of the axis line x of the leg shaft 20 of male member 2 as the outside of the bending.

In the embodiment, the upper end 30 and the lower end 31 of the connecting piece 3 are each provided with a groove section 34 extending over the width to form the thin-wall sections 33 at both the upper end 30 and the lower end 31. Accordingly, when the male member 2 is pushed into the female member 1, the connecting pieces 3 bend smoothly around the mid sections thereof. A half of the length of the connecting piece 3 is set to fit within the width of the head 21 of the male member 2, i.e., within the length of one side of the head 21 of the male member 2 with a substantially square outline.

In the embodiment, the thin-wall sections 33 are formed in a substantially middle position of the connecting pieces 3 in the longitudinal direction. A half of the length of the connecting pieces 3 is set to fit within the width of the head 21 of the male member. Accordingly, the leg shaft 20 of the male member 2 can enter straight into the female member 1 from the upper cylinder end through the pushing operation of the male member 2. The connecting pieces 3 bend and are interposed between the head 21 of the male member 2 and the outer flange 10 of the female member 1 in the fully fixed state wherein the male member 2 is fully pushed into the female member 1, so that the connecting pieces 3 do not extend beyond the outer edges of the head 21.

In the embodiment, the strip-shaped connecting pieces 3 connect the male member 2 and the female member 1 in the state wherein the surfaces face the wide width side face of the leg shaft 20 of the male member 2.

In the embodiment, it is possible to form the clip with plastic molding technique such as injection molding, so that it is easy to obtain the flexible deformation characteristic to the bending locations.

The disclosure of Japanese Patent Application No. 2004-109833, filed on Apr. 2, 2004, is incorporated in the application.

While the invention has been explained with reference to the specific embodiments of the invention, the explanation is illustrative and the invention is limited only by the appended claims.

What is claimed is:

1. A clip to be attached to a member with a first installation hole, comprising:
    a hollow female member with two open ends including an outer flange at an upper end, and a flexible engaging piece formed in a side section and having an engaging surface facing the outer flange,
    a male member formed of a leg shaft and a head provided at an upper end of the leg shaft, said male member preventing the female member from deforming inwardly when the leg shaft is pushed into the female member from the upper end, and
    a connecting piece for connecting the head of the male member with the outer flange of the female member, said connecting piece being arranged such that a lower end of the leg shaft of the male member is positioned above the upper end of the female member in a non-use condition, said connecting piece being bent in a use condition to locate the leg shaft in the female member when the male member is pushed into the female member,
    wherein said connecting piece is located on one side of the leg shaft of the male member, and includes an upper end connected to the head of the male member, a lower end connected to the outer flange of the female member, and a mid section so that the connecting piece bends around the mid section toward the leg shaft of the male member when the male member is pushed into the female member.

2. A clip according to claim 1, wherein said connecting piece includes two connecting portions disposed on two sides of the leg shaft of the male member.

3. A clip according to claim 2, wherein said head of the male member and said outer flange of the female member are formed in substantially square shapes, respectively; one of said two connecting portions has an upper end connected to one corner of the head of the male member and a lower end connected to one corner of the outer flange of the female member located below the one corner of the head; and the other of said two connecting portions has an upper end connected to another corner of the head of the male member located diagonally opposite to said one corner and a lower end connected to another corner of the outer flange of the female member located diagonally opposite to the one corner.

4. A clip according to claim 3, wherein said connecting portions have a width less than a half length of one side of the head with the square shape so that the connecting portions can be bent without interfering with each other and the leg shaft.

5. A clip according to claim 1, wherein said connecting piece further includes a thin-wall section at a substantially mid portion thereof in a longitudinal direction, said connecting piece having a length a half of which is fit within a width of the head of the male member.

6. A clip according to claim 1, wherein said flexible engaging piece formed in the side section is defined by slits, said flexible engaging piece deforming inwardly when the female member is inserted into the first installation hole and restoring an original shape thereof to engage an edge of the first installation hole when the female member is fully inserted into the first installation hole.

7. A clip according to claim 1, wherein said leg shaft further includes a catch section at a lower end thereof, said catch section engaging the female member when the male member is fully inserted into the female member.

8. An airbag body installation structure comprising said member with the first installation hole, said clip according to claim 1, and an installation plate adapted to be attached to an airbag body and having a second installation hole so that after the first installation hole is aligned with the second installation hole, the female member is inserted into the first and second installation holes, and the leg shaft of the male member is pushed into the female member to install the airbag body to the member with the first installation hole.

* * * * *